United States Patent [19]
Baerwolf et al.

[11] Patent Number: 6,019,326
[45] Date of Patent: Feb. 1, 2000

[54] VIDEO ENHANCEMENT KIT

[76] Inventors: Ricky J. Baerwolf, N3410 Hwy. 146;
Mark A. Salzman, N6443 Burns, both of Fall River, Wis. 53932

[21] Appl. No.: 09/107,638

[22] Filed: Jun. 30, 1998

Related U.S. Application Data

[63] Continuation-in-part of application No. 08/773,630, Dec. 23, 1996.
[51] Int. Cl.⁷ ..................................................... G21C 3/00
[52] U.S. Cl. .................................. 248/177.1; 248/298.1; 352/243; 396/422; 396/432
[58] Field of Search ........................... 248/287.1, 295.11, 248/298.11, 309.1; 396/419, 422, 428, 432; 352/243

[56] References Cited

U.S. PATENT DOCUMENTS

| | | | |
|---|---|---|---|
| 2,933,992 | 4/1960 | Bushnell et al. | 396/432 |
| 2,990,759 | 7/1961 | Marcosky | 396/432 X |
| 3,055,283 | 9/1962 | Suzuki | 352/243 X |
| 4,445,766 | 5/1984 | Yamazaki | 396/432 |
| 4,566,768 | 1/1986 | Bosdet | 352/243 X |
| 4,578,708 | 3/1986 | Munnion | 352/243 X |
| 4,763,151 | 8/1988 | Klinger | 352/243 X |
| 5,332,136 | 7/1994 | Rudolph | 352/243 X |

*Primary Examiner*—Derek J. Berger

[57] ABSTRACT

A video enhancement kit is provided for use with a support, a video camera, a magnification lens assembly, and a plurality of couples. The kit preferably includes an elongated base strip removably coupled to the support with the video camera removably coupled thereon at a user selected position along a length of the base strip. Also included is a mount removably coupled to the elongated base strip via one of the couples. The mount is further removably coupled to the magnification lens assembly via one of the couples for aligning the magnification lens assembly with the video camera.

3 Claims, 3 Drawing Sheets

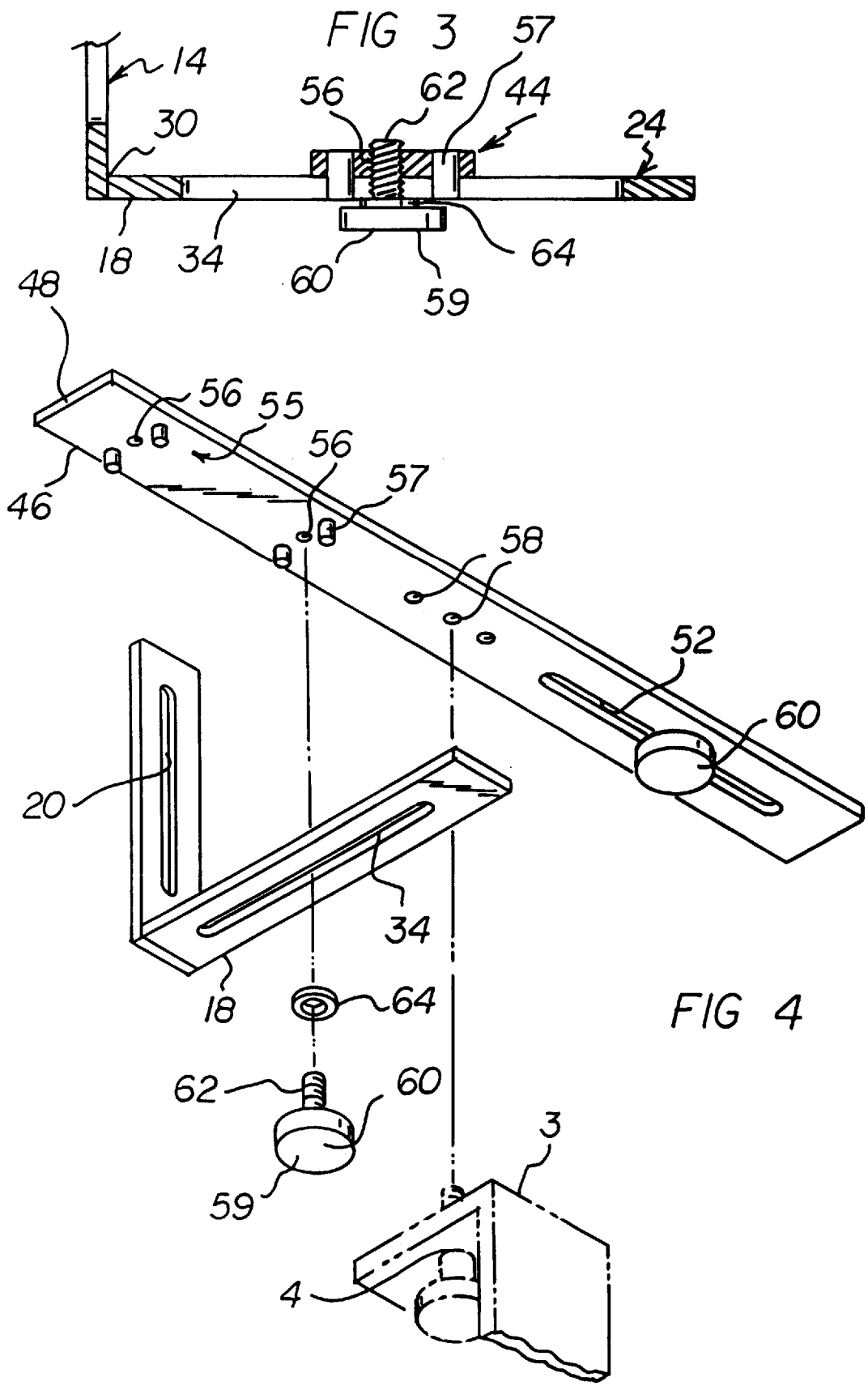

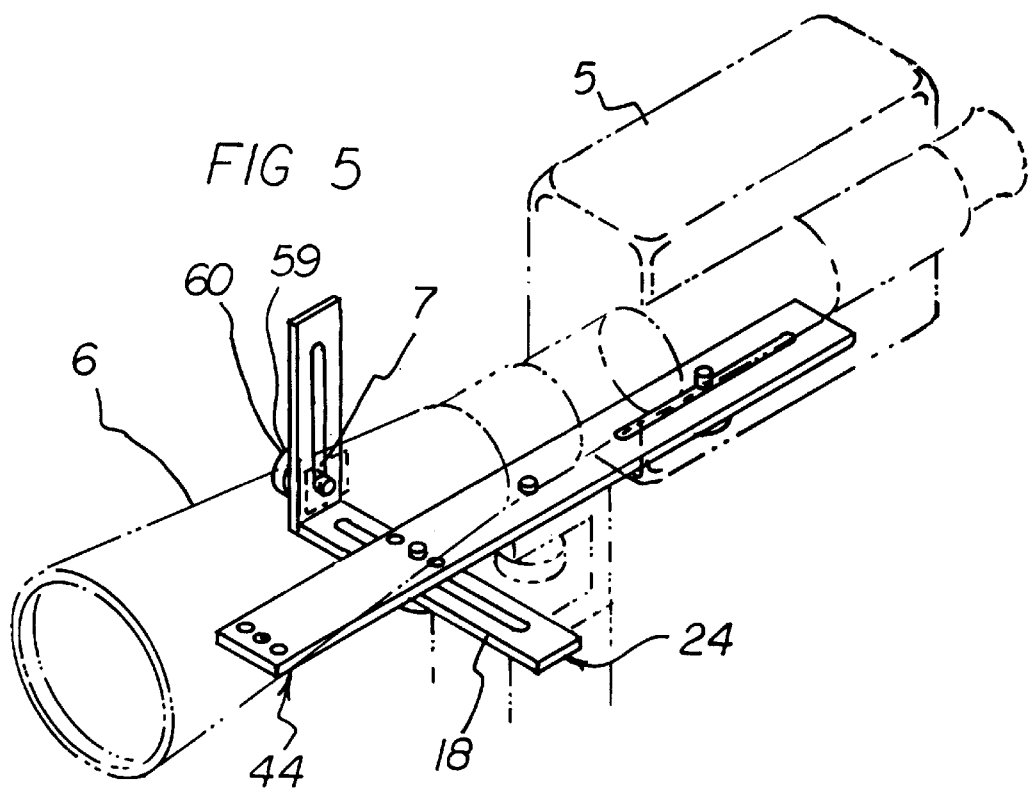
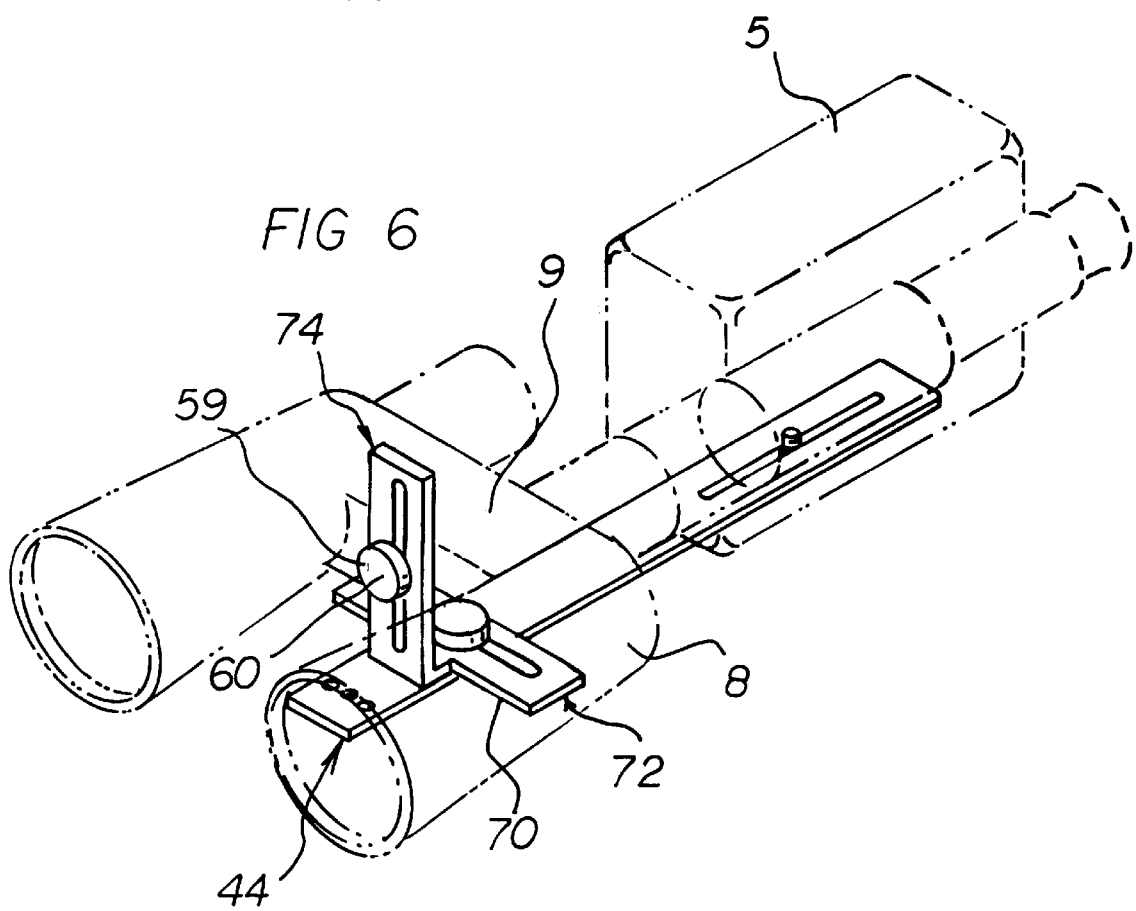

VIDEO ENHANCEMENT KIT

RELATED APPLICATIONS

This application is a continuation-in-part application of an application filed Dec. 23, 1996 under U.S. Ser. No. 08/773,630.

BACKGROUND OF THE INVENTION

1. Field of the Invention

The present invention relates to a video enhancement kit and more particularly pertains to aligning a magnification assembly with a video camera.

2. Description of the Prior Art

The use of video camera mounts is known in the prior art. More specifically, video camera mounts heretofore devised and utilized for the purpose of supporting a video camera are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. Des. 344,969; U.S. Pat. No. 5,267,712; U.S. Pat. No. 5,203,871; U.S. Pat. No. 5,194,992; U.S. Pat. No. 5,130,851; and U.S. Pat. No. 4,834,514.

In this respect, the video enhancement kit according to the present invention substantially departs from the conventional concepts and designs of the prior art, and in so doing provides an apparatus primarily developed for the purpose of aligning a magnification assembly with a video camera.

Therefore, it can be appreciated that there exists a continuing need for a new and improved video enhancement kit which can be used for aligning a magnification assembly with a video camera. In this regard, the present invention substantially fulfills this need.

SUMMARY OF THE INVENTION

In view of the foregoing disadvantages inherent in the known types of video camera mounts now present in the prior art, the present invention provides an improved video enhancement kit. As such, the general purpose of the present invention, which will be described subsequently in greater detail, is to provide a new and improved video enhancement kit which has all the advantages of the prior art and none of the disadvantages.

To attain this, the present invention is adapted for use with a stand having an inverted L-shaped support with a vertically oriented hole formed therein. Note FIG. 5. Also included is a video camera with a threaded bore formed in a bottom thereof, as shown in FIGS. 5 & 6. With reference solely to FIG. 5, a spotting scope is shown to have a cylindrical configuration and a threaded bore formed in a side thereof. The threaded bore of the spotting scope resides along an axis perpendicular with respect to that about which the spotting scope is formed. Associated therewith is a pair of binoculars including a pair of side portions each having a cylindrical configuration with a common diameter. The side portions of the binoculars are connected via an interconnect with a threaded bore formed in a front thereof. This threaded bore is situated about an axis residing in parallel with those about which the side portions are formed. As shown throughout the Figures, a plurality of couples are provided each including a disk-shaped handle. Each couple is equipped with a threaded bolt coupled to the handle and extending therefrom in concentric relationship therewith. As best shown in FIG. 4, a base strip is included with a planar rectangular configuration. The base strip includes a top face, a bottom face and a periphery formed therebetween. This periphery is defined by a pair of elongated parallel side edges and a short first and second end edge. The base strip includes three linearly aligned threaded bores formed therein. Such three linearly aligned threaded bores are positioned at a central extent of the base strip along a central longitudinal axis. The base strip further includes a linear elongated slot formed between the central extent of the base strip and the first end edge thereof. As best shown in FIG. 2, a pair of mounting assemblies are positioned adjacent to the second end edge of the base strip and adjacent to the central extent of the base strip, respectively. Each mounting assembly includes a central threaded bore formed in the base strip along the central longitudinal axis thereof. Further, a pair of cylindrical tabs are integrally coupled to the bottom face of the base strip and depend therefrom. In the preferred embodiment, the cylindrical tabs flank the associated threaded bore. In use, the base strip is removably mounted on the support of the stand via one of the couples. The threaded post of such couple passes through the hole of the stand and is threadedly coupled to one of the threaded bores of the central extent of the base strip. Note FIG. 4. As show in FIGS. 5 & 6, the camera is removably mounted to the top face of the base strip adjacent to the first end edge thereof via one of the couples. The threaded post of such couple is slidably situated through the elongated slot of the base strip and also threadedly coupled to the threaded bore of the camera. As shown in the various Figures including FIG. 5, a spotting scope mount is included having an L-shaped configuration. The spotting scope is equipped with a horizontal extent and a vertical extent. The vertical extent is coupled to the horizontal extent in an end-to-end relationship and is further situated in a separate perpendicular plane. Each extent of the spotting scope mount has a linear elongated slot formed therein along a central longitudinal axis thereof. By this structure, the elongated slot of the horizontal extent is slidably mounted along the cylindrical tabs of one of the mounting assemblies. Further, the horizontal extent is removably mounted to the base strip via one of the couples. AS shown in FIG. 5, the threaded post of such couple passes through the elongated slot of the horizontal extent and is threadedly coupled to the threaded bore of the associated mounting assembly. It should be noted that the spotting scope is removably mounted to the vertical extent of the spotting scope mount via one of the couples the threaded post of which passes through the slot of the vertical extent of the spotting scope mount and is threadedly engaged with the threaded bore of the spotting scope. Finally, a binoculars mount has a T-shaped configuration with a horizontal extent and a vertical extent. As shown in FIG. 6, the vertical extent of the binoculars mount has an end edge mounted to a central extent of a side edge of the horizontal extent. As such, the horizontal extent and the vertical extent are situated in perpendicular planes. In use, the elongated slot of the horizontal extent of the binoculars mount is slidably mounted along the cylindrical tabs of one of the mounting assemblies. Further, the horizontal extent is removably mounted to the base strip via one of the couples. The threaded post of such couple passes through the elongated slot of the horizontal extent of the binoculars mount. This threaded post is further threadedly coupled to the threaded bore of the associated mounting assembly. The binoculars is mounted to the vertical extent of the binoculars mount via one of the couples. A shown in FIG. 5, the threaded post of such couple is slidably positioned through the slot of the vertical extent of the binoculars mount and is also threadedly engaged with the threaded bore of the binoculars.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved video enhancement kit which has all the advantages of the prior art video camera mounts and none of the disadvantages.

It is another object of the present invention to provide a new and improved video enhancement kit which may be easily and efficiently manufactured and marketed.

It is a further object of the present invention to provide a new and improved video enhancement kit which is of a durable and reliable construction.

An even further object of the present invention is to provide a new and improved video enhancement kit which is susceptible of a low cost of manufacture with regard to both materials and labor, and which accordingly is then susceptible of low prices of sale to the consuming public, thereby making such video enhancement kit economically available to the buying public.

Still yet another object of the present invention is to provide a new and improved video enhancement kit which provides in the apparatuses and methods of the prior art some of the advantages thereof, while simultaneously overcoming some of the disadvantages normally associated therewith.

Still another object of the present invention is to align a magnification assembly with a video camera.

Lastly, it is an object of the present invention to provide a new and improved video enhancement kit for use with a support, a video camera, a magnification lens assembly, and a plurality of couples. The kit preferably includes an elongated base strip removably coupled to the support with the video camera removably coupled thereon at a user selected position along a length of the base strip. Also included is a mount removably coupled to the elongated base strip via one of the couples. The mount is further removably coupled to the magnification lens assembly via one of the couples for aligning the magnification lens assembly with the video camera.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side cross-sectional view of the present invention.

FIG. 4 is an exploded perspective view of the present invention.

FIG. 5 is a perspective view of the present invention in use in combination with a spotting scope.

FIG. 6 is a perspective view of the present invention in use in combination with a pair of binoculars.

Similar reference characters refer to similar parts throughout the several views of the drawings.

DESCRIPTION OF THE PREFERRED EMBODIMENT

Figure 1:
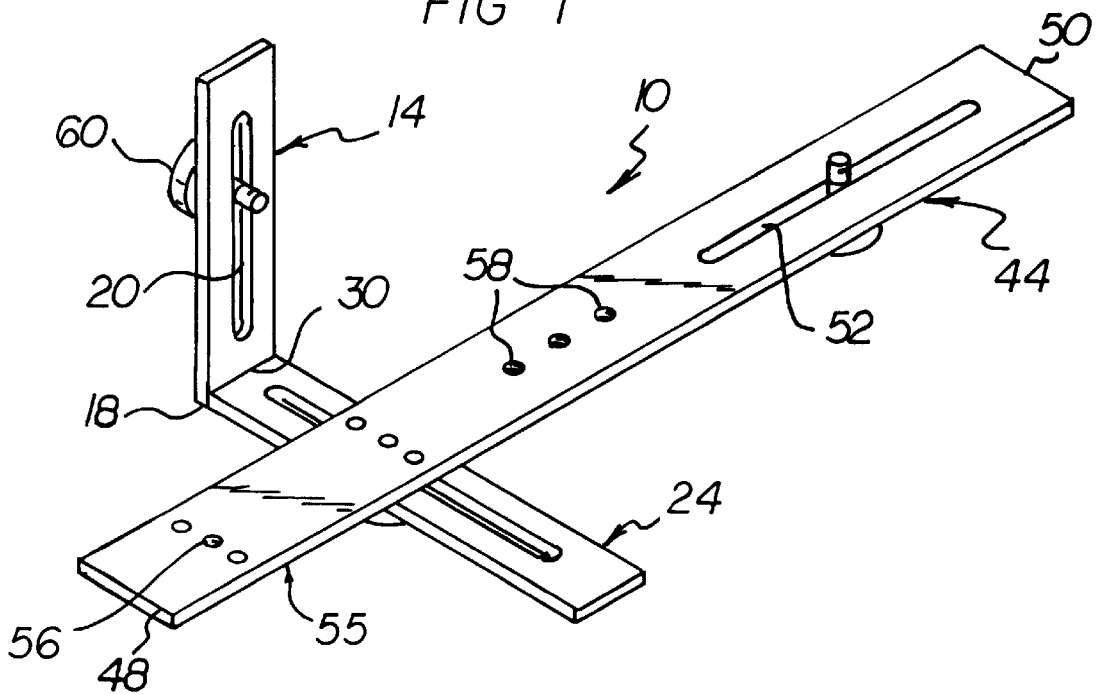
FIG. 1 is a perspective illustration of the preferred embodiment of the video enhancement kit constructed in accordance with the principles of the present invention.

With reference now to the drawings, and in particular to FIG. 1 thereof, a new and improved video enhancement kit embodying the principles and concepts of the present invention and generally designated by the reference numeral 10 will be described.

The present invention, the new and improved video enhancement kit, is comprised of a plurality of components. Such components in their broadest context include base strip, spotting scope mount, and binocular mount. Such components are individually configured and correlated with respect to each other so as to attain the desired objective.

More specifically, it will be noted that the system 10 of the present invention, designated as numeral 10, is adapted for use with a stand 3 having an inverted L-shaped support with a vertically oriented hole 4 formed therein. Note FIG. 5. Also included is a video camera 5 with a threaded bore formed in a bottom thereof, as shown in FIGS. 5 & 6.

With reference solely to FIG. 5, a spotting scope 6 is shown to have a cylindrical configuration and a conventional threaded bore 7 formed in a side thereof. The threaded bore of the spotting scope resides along an axis perpendicular with respect to that about which the spotting scope is formed.

Associated therewith is a pair of binoculars 8 including a pair of side portions each having a cylindrical configuration with a common diameter. The side portions of the binoculars are connected via an interconnect 9 with a conventional threaded bore formed in a front thereof. This threaded bore is situated about an axis residing in parallel with those about which the side portions are formed. It should be noted that the threaded bores of the spotting scope and the binoculars are conventionally adapted for allowing the same to be mounted to a standard tripod.

As shown throughout the Figures, a plurality of couples 59 are provided each including a disk-shaped handle 60. Each couple is equipped with a threaded bolt 64 coupled to the handle and extending therefrom in concentric relationship therewith.

As best shown in FIG. 4, a base strip 44 is included with a planar rectangular configuration. The base strip includes a top face, a bottom face and a periphery formed therebetween. This periphery is defined by a pair of elongated parallel side edges and a short first end edge 50 and second end edge 48. The base strip includes three linearly aligned threaded bores 58 formed therein. Such three linearly aligned threaded bores are positioned at a central extent of the base strip along a central longitudinal axis thereof.

Figure 2:
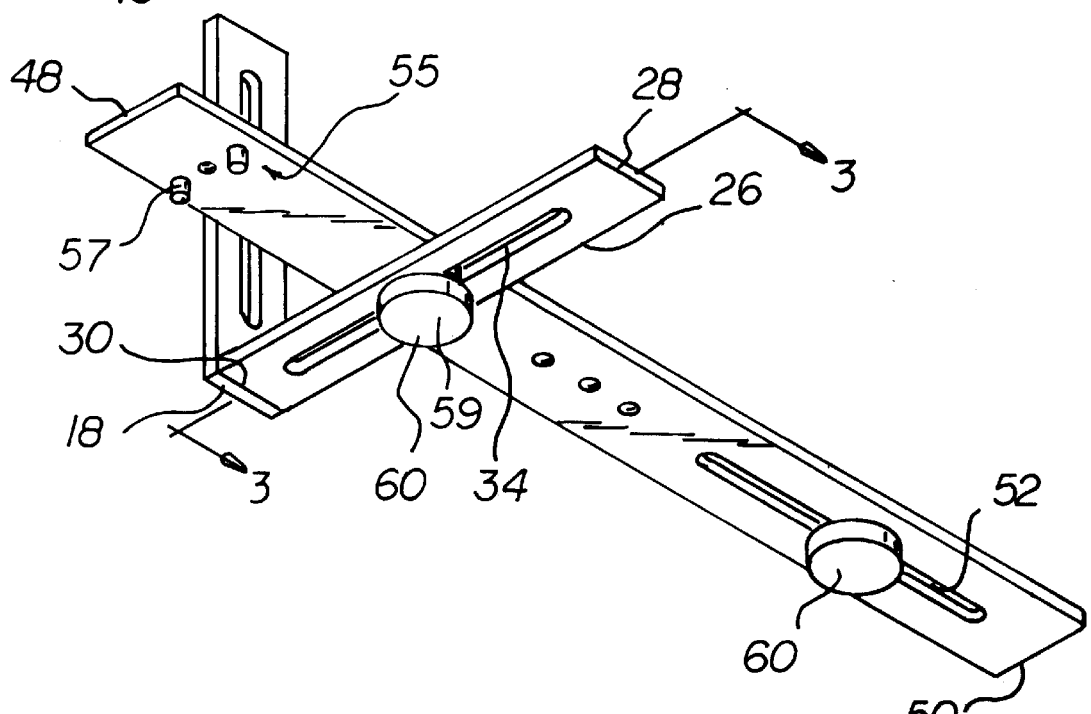
FIG. 2 is a bottom perspective view of the present invention.

The base strip further includes a linear elongated slot 52 formed between the central extent of the base strip and the first end edge thereof. As best shown in FIG. 2, a pair of mounting assemblies 55 are positioned adjacent to the second end edge of the base strip and adjacent to the central extent of the base strip, respectively. Each mounting assembly includes a central threaded bore 56 formed in the base strip along the central longitudinal axis thereof. Further, a pair of cylindrical tabs 57 are integrally coupled to the bottom face of the base strip and depend therefrom. In the preferred embodiment, the cylindrical tabs flank the associated threaded bore.

In use, the base strip is removably mounted on the support of the stand via one of the couples 59. The threaded post of such couple passes through the hole of the stand and is threadedly coupled to one of the threaded bores of the central extent of the base strip. As an option, a washer 64 may be employed, as shown in FIG. 4. As an option, the stand may take the form of a clip adapted to be removably mounted to a window of a vehicle.

As show in FIGS. 5 & 6, the camera is removably mounted to the top face of the base strip adjacent to the first end edge thereof via one of the couples 59. The threaded post of such couple is slidably situated through the elongated slot of the base strip and also threadedly coupled to the threaded bore of the camera. As such, the camera may be selectively situated along the central longitudinal axis of the base strip.

As shown in the various Figures including FIG. 5, a spotting scope mount 18 is included having an L-shaped configuration. The spotting scope is equipped with a horizontal extent 24 and a vertical extent 14. An end 30 of the vertical extent is coupled to the horizontal extent in an end-to-end relationship and is further situated in a separate perpendicular plane. Each extent of the spotting scope mount has a linear elongated slot 20 & 34, respectively, formed therein along a central longitudinal axis thereof.

By this structure, the elongated slot of the horizontal extent is slidably mounted along the cylindrical tabs of one of the mounting assemblies depending on the size of the spotting scope. Further, the horizontal extent is removably mounted to the base strip via one of the couples. As shown in FIG. 5, the threaded post of such couple passes through the elongated slot of the horizontal extent of the spotting scope mount and is threadedly coupled to the threaded bore of the associated mounting assembly. It should be noted that the spotting scope is removably mounted to the vertical extent of the spotting scope mount via one of the couples the threaded post of which passes through the slot of the vertical extent of the spotting scope mount and is threadedly engaged with the threaded bore of the spotting scope. As such, the spotting scope mount permits vertical and horizontal adjustment of the spotting scope for aligning the same with the camera. Note FIG. 5.

Finally, a binoculars mount 70 has a T-shaped configuration with a horizontal extent 72 and a vertical extent 74. As shown in FIG. 6, the vertical extent of the binoculars mount has an end edge mounted to a central extent of a side edge of the horizontal extent. Further, the horizontal extent and the vertical extent are situated in perpendicular planes.

In use, the elongated slot of the horizontal extent of the binoculars mount is slidably mounted along the cylindrical tabs of one of the mounting assemblies. Further, the horizontal extent is removably mounted to the base strip via one of the couples. The threaded post of such couple passes through the elongated slot of the horizontal extent of the binoculars mount. This threaded post is further threadedly coupled to the threaded bore of the associated mounting assembly. The binoculars is mounted to the vertical extent of the binoculars mount via one of the couples. A shown in FIG. 5, the threaded post of such couple is slidably positioned through the slot of the vertical extent of the binoculars mount and is also threadedly engaged with the threaded bore of the binoculars. In use, the binoculars mount permits vertical and horizontal adjustment of the binoculars for aligning one of the side portions with the camera. Note FIG. 6.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved video enhancement kit comprising, in combination:

a stand including an inverted L-shaped support with a vertically oriented hole formed therein;

a video camera with a threaded bore formed in a bottom thereof;

a spotting scope having a cylindrical configuration and a threaded bore formed in a side thereof with the threaded bore of the spotting scope residing along an axis perpendicular with respect to that about which the spotting scope is formed;

a binoculars including a pair of side portions each having a cylindrical configuration with a common diameter, wherein the side portions of the binoculars are connected via an interconnect with a threaded bore formed in a front thereof about an axis residing in parallel with those about which the side portions are formed;

a plurality of couples each including a disk-shaped handle with a threaded bolt coupled thereto and extending therefrom in concentric relationship therewith;

a base strip with a planar rectangular configuration, the base strip including a top face, a bottom face and a periphery formed therebetween defined by a pair of elongated parallel side edges and a short first and second end edge, the base strip including three linearly aligned threaded bores therein at a central extent thereof along a central longitudinal axis, a linear elongated slot formed between the central extent of the base strip and the first end edge thereof, and a pair of mounting assemblies positioned adjacent to the second end edge of the base strip and adjacent to the central extent of the base strip, respectively, each mounting assembly including a central threaded bore formed in the base strip along the central longitudinal axis thereof and a pair of cylindrical tabs integrally coupled to the bottom face of the base strip and depending therefrom such that the cylindrical tabs flank the associated threaded bore;

wherein the base strip is removably mounted on the support of the stand via one of the couples the threaded post of which passes through the hole of the stand and is threadedly coupled to one of the threaded bores of the central extent of the base strip;

wherein the camera is removably mounted to the top face of the base strip adjacent to the first end edge thereof via one of the couples the threaded post of which is slidably situated through the elongated slot of the base strip and threadedly coupled to the threaded bore of the camera;

a spotting scope mount having an L-shaped configuration with a horizontal extent and a vertical extent coupled to the horizontal extent in an end-to-end relationship and further situated in a separate perpendicular plane, each extent of the spotting scope mount equipped with a linear elongated slot formed therein along a central longitudinal axis thereof, wherein the elongated slot of the horizontal extent is slidably mounted along the cylindrical tabs of one of the mounting assemblies and the horizontal extent is removably mounted to the base strip via one of the couples the threaded post of which passes through the elongated slot of the horizontal extent and is threadedly coupled to the threaded bore of the associated mounting assembly, wherein the spotting scope is removably mounted to the vertical extent of the spotting scope mount via one of the couples the threaded post of which passes through the slot of the vertical extent of the spotting scope mount and is threadedly engaged with the threaded bore of the spotting scope; and a binoculars mount having a T-shaped configuration with a horizontal extent and a vertical extent having an end edge mounted to a central extent of a side edge of the horizontal extent such that the horizontal extent and the vertical extent are situated in perpendicular planes, wherein the elongated slot of the horizontal extent of the binoculars mount is slidably mounted along the cylindrical tabs of one of the mounting assemblies and the horizontal extent is removably mounted to the base strip via one of the couples the threaded post of which passes through the elongated slot of the horizontal extent of the binoculars mount and is threadedly coupled to the threaded bore of the associated mounting assembly, wherein the binoculars is mounted to the vertical extent of the binoculars mount via one of the couples the threaded post of which passes through the slot of the vertical extent of the binoculars mount and is threadly engaged with the threaded bore of the binoculars.

2. A video enhancement kit comprising:

a support;

a video camera;

a magnification lens assembly;

a plurality of couples;

an elongated base strip removably coupled to the support with the video camera removably coupled thereon at a user selected position along a length of the base strip; and a mount removably coupled to the elongated base strip via one of the couples and further removably coupled to the magnification lens assembly via one of the couples for aligning the magnification lens assembly with the video camera, the mount having an L-shaped configuration with a horizontal extent and a vertical extent coupled to the horizontal extent in an end-to-end relationship and further situated in a separate perpendicular plane with at least one extent of the mount being equipped with a linear elongated slot formed therein.

3. A video enhancement kit comprising:

a support;

a video camera;

a magnification lens assembly;

a plurality of couples;

an elongated base strip removably coupled to the support with the video camera removably coupled thereon at a user selected Position along a length of the base strip; and a mount removably coupled to the elongated base strip via one of the couples and further removably coupled to the magnification lens assembly via one of the couples for aligning the magnification lens assembly with the video camera, the mount having a T-shaped configuration with a horizontal extent and a vertical extent having an end edge mounted to a central extent of a side edge of the horizontal extent such that the horizontal extent and the vertical extent are situated in perpendicular planes, wherein at least one of the extents has an elongated slot formed therein.

* * * * *